3,348,001
ELECTRIC DISTRIBUTION SYSTEM
Chester W. Upton, Jr., Penn Township, Trafford, and George Siviy, Monroeville, Pa., assignors to Westinghouse Electric Corporation, Pittsburgh, Pa., a corporation of Pennsylvania
Filed July 26, 1965, Ser. No. 474,755
8 Claims. (Cl. 200—48)

This invention relates, generally, to electric distribution systems and, more particularly, to an enclosed gas-filled disconnect switch and bus structure for use in a distribution substation.

The rapidly increasing electrical load demands in densely populated areas coupled with the economic considerations associated with bringing extra high voltage (EHV) power into these urban areas creates a new problem for the electric utility companies. Electric power can be brought into urban areas at EHV levels by enclosed underground conductors. The termination of the EHV underground conductors in a conventional aboveground substation in an urban area would require a vast space which is generally not available and would also be prohibitive in cost. Therefore, the need has arisen for a compact substation at high voltage levels which makes economically feasible the transmission and termination of large blocks of EHV power into heavily populated load centers. Such a substation is described in a copending application Ser. No. 474,779, filed July 26, 1965, by D. L. Whitehead and assigned to the Westinghouse Electric Corporation.

An object of this invention is to provide a disconnect switch capable of functioning as a part of a substation of the type described in the aforesaid application.

Another object of the invention is to provide a combined disconnect switch and bus structure which is enclosed in a sealed metal housing and pressurized with a gaseous dielectric.

A further object of the invention is to take care of thermal expansion of the sealed pressure enclosure and the conductor of the structure.

Still another object of the invention is to provide a quick-break auxiliary contact structure for a disconnect switch of the reciprocating type.

A still further object of the invention is to provide a compartmentalized switch and bus structure in which each compartment may be pressurized separately, or the pressure in all compartments may be equalized.

Other objects of the invention will be explained fully hereinafter or will be apparent to those skilled in the art.

In accordance with the invention, sections of a cylindrical bus conductor are supported inside sections of a generally cylindrical metal housing by generally disc-shaped insulators. Generally cylindrical metal disconnect switch housings and circuit breaker housings are connected in a substation structure as required to perform the desired switching functions by operating the disconnect switches and the circuit breakers. Spaced cylindrical switch conductors are supported inside each switch housing by combined insulators and barriers which compartmentalize the switch housing. Additional insulators and barriers are provided to sectionalize the bus structure. A reciprocating switch blade bridges the gap between two essentially spherical electrodes each one of which is attached to one end of one of the switch conductors. The other ends of the switch conductors are attached to the bus conductor sections by flexible connectors. The blade is stored within one electrode and one switch conductor and actuated by some means such as a gear and rack mechanism. A spring-actuated quick-break auxiliary contact structure may be incorporated in the main contact structure.

For a better understanding of the nature and objects of the invention, reference may be had to the following detailed description, taken in conjunction with the accompanying drawings, in which:

FIG. 4 is a detailed view of a quick-break auxiliary contact structure for a disconnect switch.

Figure 1:
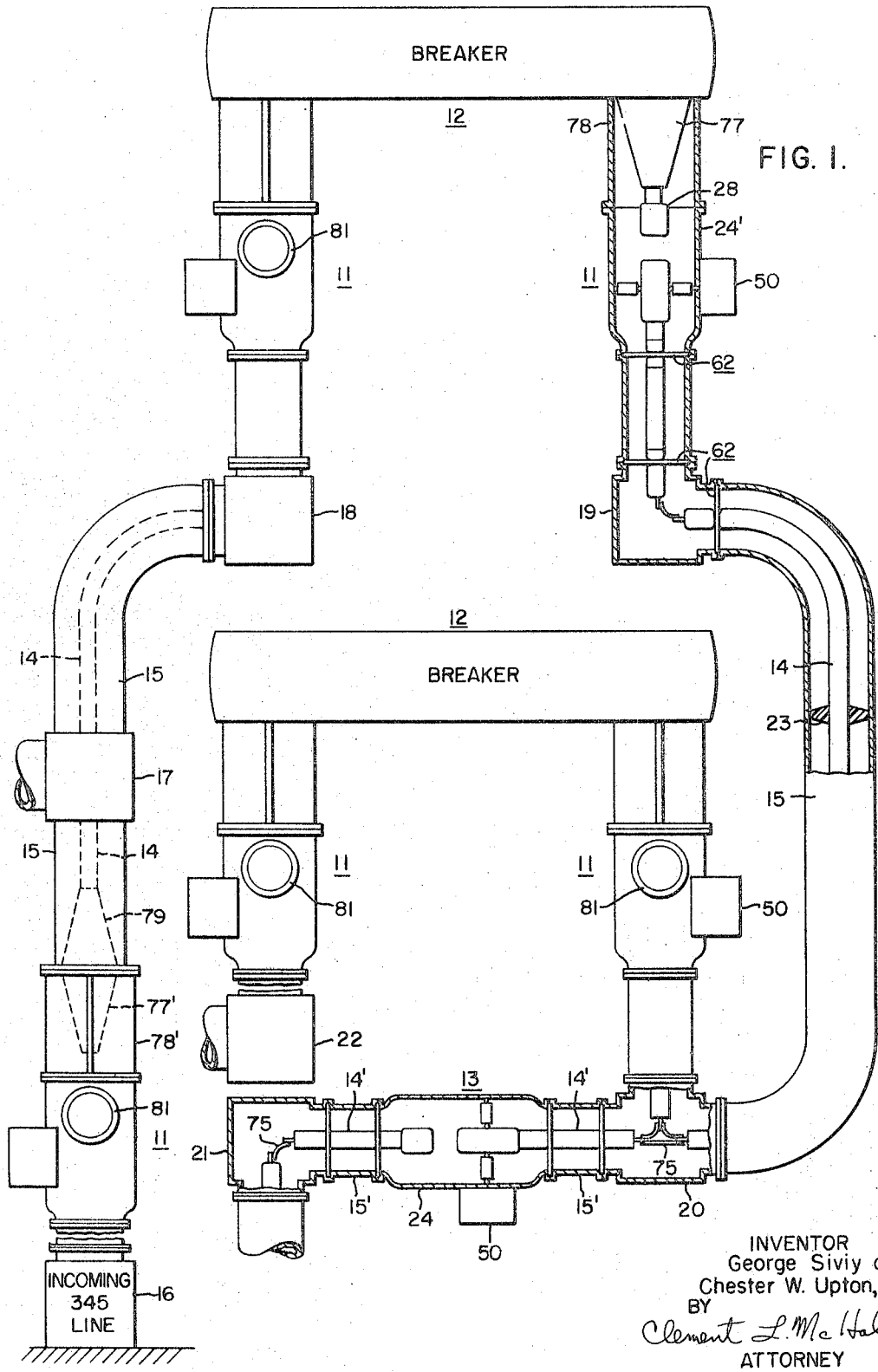
FIGURE 1 is a view, in elevation, of a portion of a substation structure embodying features of the invention.

Referring to the drawings, and particularly to FIG. 1, the structure shown therein comprises one pole unit of a distribution substation of the type described in the aforesaid copending application. Additional pole units, similar to the one shown, may be provided as required. Each pole unit comprises a plurality of vertical disconnect switches 11, circuit breakers 12, and a horizontal disconnect switch 13 which are interconnected by generally cylindrical bus conductors 14 enclosed in generally cylindrical housings 15 which are joined by various junction boxes 16 to 22, inclusive. Thus, an incoming high voltage line connected to the junction box 16 may be connected through a vertical disconnect switch 11, a bus conductor 14, a junction box 17, a bus conductor 14, a junction box 18, a vertical disconnect switch 11, a circuit breaker 12, a vertical disconnect switch 11, a junction box 19, a bus conductor 14, a junction box 20, a bus conductor 14, the horizontal disconnect switch 13, a bus conductor 14 and the junction box 21 to a transformer (not shown). Another high voltage line may be connected to the system through the junction box 17. Likewise, an additional high voltage line may be connected to the junction box 22 and thence to the transformer through a vertical disconnect switch 11, a circuit breaker 12, a vertical disconnect switch 11, the junction box 20 and the horizontal disconnect switch 13. Thus, the transformer may be connected to different power sources.

As shown, the bus conductors 14 are supported inside the cylindrical housings 15 by generally disc-shaped insulators 23. The housings 15, the disconnect switches 11 and 13 and the circuit breakers 12 contain an insulating gas, preferably sulfur hexafluoride, $SF_6$, under pressure. As will be explained more fully hereinafter, provision is made for sectionalizing the bus conductor housing and compartmentalizing the disconnect switches to permit components of the structure to be taken out of service without affecting the operation of the remaining components of the substation structure. The circuit breakers 12 may be of a gas blast type, such as, for example, the one described in U.S. Patent No. 3,154,658, issued Oct. 27, 1964, and assigned to the Westinghouse Electric Corporation.

Figure 3:
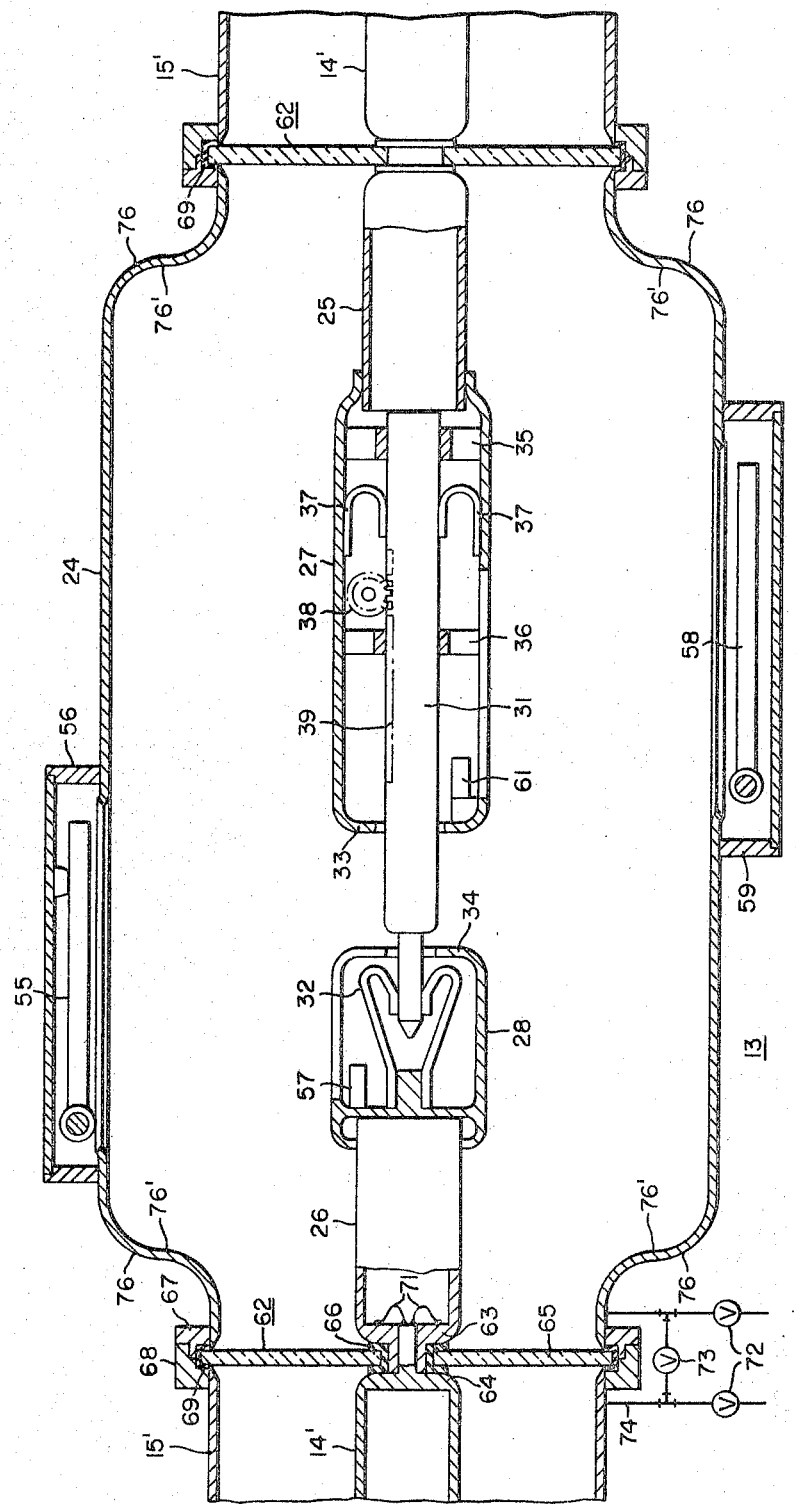
FIG. 3 is a view, similar to FIG. 2, of the horizontal disconnect switch shown in FIG. 1.

The structure of the horizontal disconnect switch 13 is shown in more detail in FIG. 3. The switch comprises a generally cylindrical housing 24 which contains longitudinally spaced cylindrical switch conductors 25 and 26, a generally cylindrical grading shield or electrode 27 having one end attached to one end of the conductor 25, a generally cylindrical grading shield or electrode 28 having one end attached to one end of the conductor 26, and a reciprocating switch blade 31 which engages break-jaw contact fingers 32 when in the closed position. The electrode 27 has a generally spherical end 33 which is spaced from a generally spherical end 34 on the electrode 28. Thus, the electrodes are essentially spherical insofar as voltage stresses between the electrodes are concerned.

The switch blade 31 is slidably disposed in guide bearings 35 and 36 mounted inside the electrode 27. The blade 31 is slidably engaged by contact fingers 37 also mounted inside the electrode 27. The reciprocating switch blade 31 may be actuated by a gear 38 which drives a rack 39 secured to the blade 31. The blade 31 may be actuated by other suitable operating means.

Figure 2:
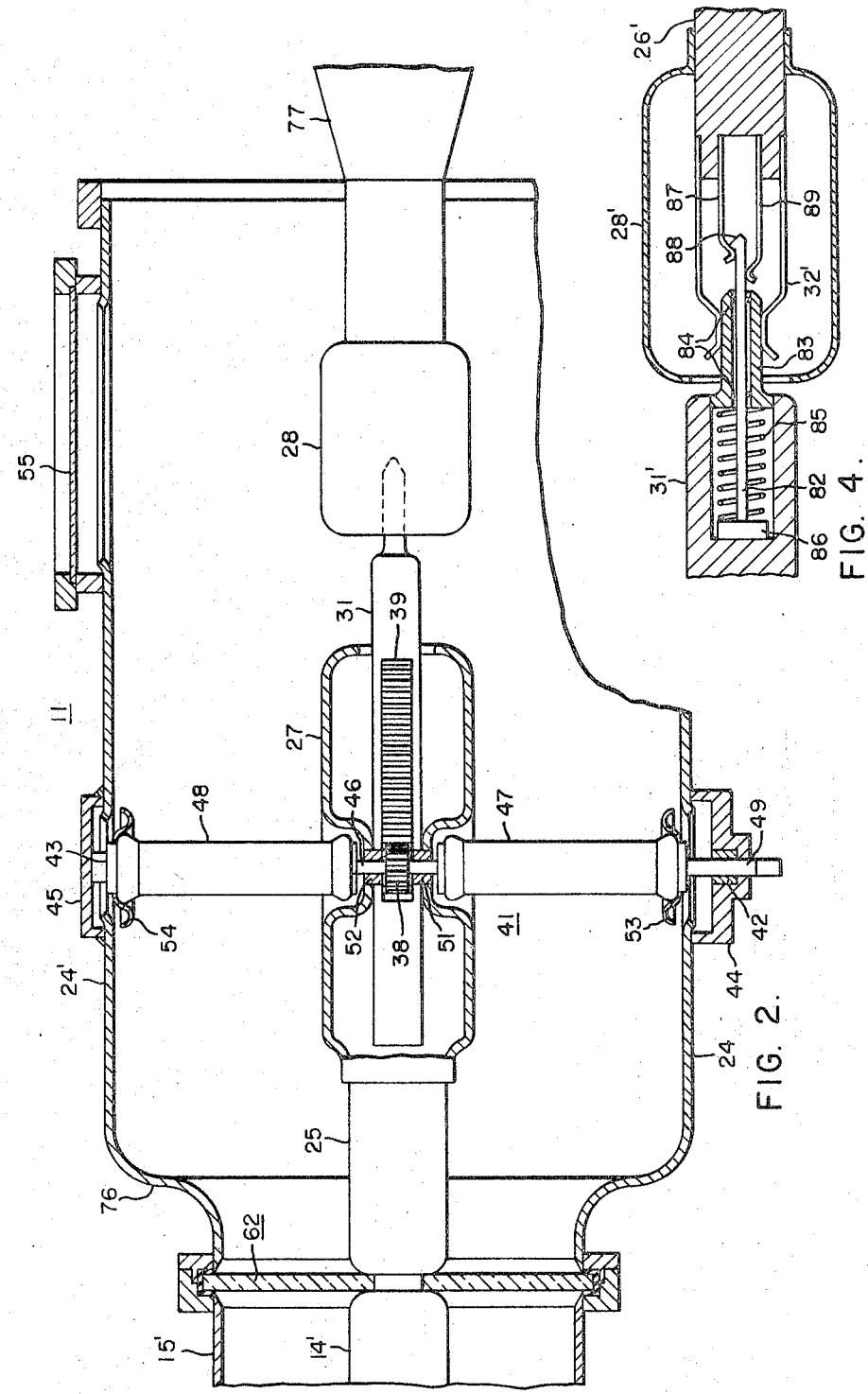
FIG. 2 is an enlarged view, partly in section and partly in elevation, of one of the vertical disconnect switches shown in FIG. 1.

As shown more clearly in FIG. 2, the gear 38 is driven by an insulating shaft 41 rotatably mounted in sealed bearings 42 and 43 disposed in bearing housings 44 and 45, respectively, attached to the switch housing 24. The insulating shaft 41 comprises a short shaft 46 on which the gear 38 is mounted and insulating members 47 and 48 attached to opposite ends of the shaft 46. An extension 49 attached to one end of the insulating member 47 extends through the bearing 42 and it may be rotated by a suitable mechanism, such as a motor operated mechanism 50 as shown in FIG. 1. An extension on the outer end of the member 48 is supported by the bearing 43. The short shaft 46 is mounted on bearings 51 and 52, which in turn, are mounted in recessed portions of the wall of the electrode 27. Thus, the electrode 27 and the shaft 41 are so interconnected and supported that the shaft can actuate the switch blade 31 through the gear 38 and the rack 39. The members 47 and 48 are composed of a suitable insulating material, preferably porcelain. Voltage grading rings 53 and 54 are provided at the outer ends of the insulating members 47 and 48, respectively.

As shown in FIG. 3, a grounding switch blade 55 is pivotally mounted in a recessed portion 56 of the housing 24. The blade 55 may be actuated by suitable means to engage a grounding contact jaw 57 disposed inside the electrode 28. A suitable slot is provided in the wall of the electrode 28 to permit the end of the blade 57 to enter the electrode. A similar grounding switch blade 58 is pivotally mounted in another recessed portion 59 of the housing 24. The blade 58 may be actuated to engage a grounding contact jaw 61 inside the electrode 27. Thus, the portions of the bus structure connected to the electrodes 27 and 28 may be grounded through the grounding switch blades since the switch housing 24 as well as the bus conductor housings 15 are grounded.

In order to compartmentalize the switch and the bus structure, combined insulator and barrier units 62 are provided at the desired locations throughout the structure. Thus, by providing two of the units 62 at each end of the disconnected switch 13, as shown in FIG. 3, the switch can be maintained or replaced readily without causing loss of gas in other parts of the system. When energized and operating the pressurized components are interconnected and the dielectric gas can circulate freely. Likewise, by providing the units 62 at desired locations in the bus structure, as shown in FIG. 1, the bus is compartmentalized or sectionalized to permit certain sections to be taken out of service without the loss of gas in the other sections of the structure.

The combined insulator and barrier units 62 may be of the type fully described in a copending application Ser. No. 474,794, filed July 26, 1965 by D. L. Whitehead which issued July 18, 1967, as U.S. Patent 3,331,911 and which is assigned to the Westinghouse Electric Corporation. Briefly, as shown in FIG. 3, each unit 62 comprises two generally T-shaped members 63 and 64 having round heads which are connected to the conductor sections 26 and 14', respectively. The member 63 has a hole through its head and stem, and the stem of the member 64 extends through the hole in the member 63, thereby providing a variable space between the two heads. A generally disc-shaped insulator 65 is mounted in the space with a gasket seal 66 between the insulator and the head compressed by drawing the heads together by means of bolts (not shown). The outer rim of the insulator 65 is sealed between spaced portions of flanges 67 and 68 on the switch housing 24 and the bus conductor housing 15', respectively, with a gasket 69 compressed by drawing the flanges together by means of bolts (not shown). Flexible connectors 71 attached to the stem of the T-shaped member 64 and the head of the member 63 provide a continuous current path through the barrier structure. Gas-filling valves 72 and a bypass valve 73 are connected around the barrier by means of pipe 74, thereby controlling the flow of gas around the barrier and permitting each compartment of the structure to be filled with gas separately from the other compartments.

The insulator 65 is preferably composed of a synthetic resin, thereby having sufficient flexibility to take care of thermal expansion in the current conductors. As shown in FIG. 1, flexible connectors 75 may be utilized in the junction boxes of the bus structure to take care of expansion of the bus conductors.

As shown in FIG. 3, the cylindrical switch housing 24 is of a larger diameter than the adjoining bus conductor housings 15', thereby providing the necessary clearance between the switch housing and the components of the disconnect switch. The ends of the switch housing 24 are curved inwardly at 76 to a diameter corresponding to that of the bus conductor housing 15'. Each end has a flat portion 76' between two curved portions thereby providing sufficient flexibility in the ends 76 to permit axial motion and take care of thermal expansion.

The vertical disconnect switch 11 shown in FIG. 2 is similar to the horizontal switch 13 with the exception that the break jaw assembly is supported by a terminal bushing 77 of the circuit breaker with which the disconnect switch is associated. As shown in FIG. 1, the housing 24' of the disconnect switch 11 is attached to a housing portion 78 of the circuit breaker 12 which encloses the terminal bushing 77 of the breaker. Also, the switch housing 24' has a curved portion 76 at only one end of the housing which is attached to the bus structure.

As also shown in FIG. 1, the upper end of the incoming line disconnect switch 11 is attached to a housing section 78' which encloses a terminal bushing 77' similar to the bushing 77 of the circuit breaker 12. A pressure bulk head 79, similar to the terminal bushing 77' may be provided in the housing 15 at the end of the bus run which connects to the incoming line disconnect switch 11. As shown in FIG. 1, a gasketed transparent cover 81 is so located on each disconnect switch that the position of the main and the grounding switch blades can be seen from outside the switch housing.

A restrike free quick-break auxiliary contact structure may be provided as shown in FIG. 4. A quick-break auxiliary blade 82 is slidably disposed within an extension 83 on the main switch blade 31'. The blade 82 is mounted in guide bearings 84 in the extension 83. A compression spring 85 is disposed around the blade 82 between the inner end of the extension 83 and an enlarged portion 86 on the inner end of the blade 82.

When the switch is closed, latch spring members 87 engage a projection 88 on the outer end of the auxiliary blade 82. Quick-break contact fingers 89, which are attached to the switch conductor 26' slidably engage the auxiliary blade 82. The main contact fingers 32' slidably engage the extension 83 on the main blade 31'.

When the switch is open, the main contact fingers 32' are disengaged from the extension 83, but the auxiliary blade 82 is restrained by the latch members 87 until such time as the main blade 31' is withdrawn sufficiently to compress the spring 85, thereby energizing the spring to withdraw the auxiliary blade 82 from the latch members 87 and disengage the auxiliary blade from the contact fingers 89 with a quick action.

During the time that the auxiliary blade 82 remains in engagement with the contact fingers 89 after the main contact fingers 32' are disengaged from the extension 83 on the main blade 31' the current path is through the auxiliary blade 82 and the spring 85 to the main blade 31' since the auxiliary blade 82 is insulated from the extension 83 by the bearings 84 which are preferably composed of an insulating material, such as polytetrafluoroethylene, sold under the trade name "Teflon." In the foregoing manner a quick-break auxiliary contact arrangement is provided for a main switch structure of the reciprocating type. The high speed with which the auxiliary contacts are separted and the large gap separation in a high dielectric gas make possible the restrike free performance.

From the foregoing description it is apparent that the invention provides a compact disconnect switch and bus structure which requires much less space than prior structures of the air insulated type. Thus, the phase spacing of approximately 15 feet required for conventional air insulated systems of 245 kv., for example, can be reduced to the point where the pressurized grounded phase enclosures can touch each other if desired. Personnel can work around the switch and bus runs in absolute safety. The possibility of phase-to-phase fault by accidental bridging of phases by cranes and so forth is eliminated. A conventional pole unit of an air insulated switch for 245 kv. is approximately 16 feet long, 15 feet high, and, as previously mentioned, requires a phase spacing of approximately 15 feet. The space saving advantage of the enclosed gas filled switch herein described is apparent since the present switch occupies a space on the order of only 10 feet long and 3 feet in diameter when built for 245 kv. service.

Furthermore, the compartmentalized system of switches and bus structure is such that a component can be maintained or replaced without causing loss of gas in other parts of the system. Thermal expansion of the components of the structure is taken care of by flexible members of the structure. The separable contacts are actuated by a suitably insulated mechanical system driven from outside the pressure system. A restrike free quick-break auxiliary contact structure is provided.

Since numerous changes may be made in the above-described structure and different embodiments of the invention may be made without departing from the spirit and scope thereof, it is intended that all subject matter contained in the foregoing description or shown in the accompanying drawing shall be interpreted as illustrative and not in a limiting sense.

We claim as our invention:

1. In a combined disconnect switch and bus structure, in combination, two spaced sections of bus conductor housing, a bus conductor in each housing, a generally cylindrical, hollow switch housing connected between the bus conductor housings in sealed relation therewith, two spaced switch conductors disposed inside the switch housing, combined insulators and gas barriers disposed at the opposite ends of the switch housing for supporting the switch conductors and for sealing off the gas space inside the switch housing, a reciprocating switch blade connecting the two switch conductors, means for actuating the switch blade between positions inside said switch housing, valve means for bypassing said combined insulators and gas barriers and for filling said housings with an insulating gas, and an insulating gas under pressure inside the switch housing.

2. In a combined disconnect switch and bus structure, in combination, two spaced sections of bus conductor housing, a bus conductor in each housing, a generally cylindrical, hollow switch housing connected between the bus conductor housings in sealed relation therewith, two spaced switch conductors disposed inside the switch housing, combined insulators and gas barriers disposed at the opposite ends of the switch housing for supporting the switch conductors and for sealing off the gas space within the switch housing, an essentially spherical electrode attached to one end of each one of the switch conductors, a reciprocating switch blade bridging the gap between the electrodes, means for actuating the switch blade, the movement of said switch blade being limited to inside said switch housing, flexible means connecting ends of the conductors within the bus conductor housings through the gas barriers, valve means for bypassing said combined insulators and gas barriers and for filling said housings with an insulating gas under pressure, and an insulating gas under pressure inside the switch housing.

3. A disconnect switch comprising a generally cylindrical, hollow housing, cylindrical conductors spaced longitudinally and disposed substantially entirely within the housing, combined insulators and gas barriers disposed at the opposite ends of the housing for supporting the conductors and for sealing off the gas space within said housing, generally cylindrical, hollow electrodes attached to the conductors, each electrode having a generally spherical end spaced from the spherical end on the other electrode, contact fingers disposed within each of the electrodes, a reciprocating switch blade slidably engaged by the fingers in one electrode, rack and gear means disposed within the one electrode for actuating the blade into and out of engagement with the fingers in the other electrode, and insulating shaft means rotatably mounted in said housing for driving said gear, said insulating shaft extending transversely across said housing.

4. A disconnect switch comprising a generally cylindrical, hollow housing, cylindrical conductors spaced longitudinally and disposed substantially entirely within the housing, combined insulators and gas barriers disposed at the opposite ends of the housing for supporting the conductors and for sealing off the gas space within said housing, generally cylindrical, hollow electrodes attached to the conductors, each electrode having a generally spherical end spaced from the spherical end on the other electrode, contact fingers disposed within each of the electrodes, a reciprocating switch blade slidably engaged by the fingers in one electrode, rack and gear means disposed within the one electrode for actuating the blade into and out of engagement with the fingers in the other electrode, guide bearing means disposed within the electrode for supporting the switch blade, insulating shaft means extending through the electrode transversely across said housing and rotatably mounted in said housing for driving said gear, and bearing means in said electrode for said shaft means, said insulating shaft means having a voltage grading ring mounted thereon at each outer end inside said housing.

5. A disconnect switch comprising a generally cylindrical, hollow housing, cylindrical conductors spaced longitudinally and disposed substantially entirely within the housing, combined insulators and gas barriers disposed at the opposite ends of the housing for supporting the conductors and for sealing off the gas space within the housing, generally cylindrical electrodes attached to the conductors, each electrode having a generally spherical end spaced from the spherical end on the other electrode, contact fingers disposed within each of the electrodes, a reciprocating switch blade slidably engaged by the fingers in one electrode, rack and gear means disposed within the one electrode for actuating the blade into and out of engagement with the fingers in the other electrode, insulating shaft means rotatably mounted in said housing for driving said gear, grounding contact means disposed in at least one of the electrodes, and grounding blade means pivotally mounted in said housing for engaging the grounding contact means, said grounding blade means being disposed generally parallel to the axis of the housing in the open position.

6. A disconnect switch comprising a generally cylindrical, hollow housing, cylindrical conductors spaced longitudinally and disposed substantially entirely within the housing, combined insulators and gas barriers disposed at the opposite ends of the housing for supporting the conductors and for sealing off the gas space within the housing, generally cylindrical electrodes attached to the conductors, each electrode having a generally spheri- cal end spaced from the spherical end on the other electrode, contact fingers disposed within the electrodes, a reciprocating switch blade slidably engaged by the fingers in one electrode, rack and gear means disposed within the one electrode for actuating the blade into and out of engagement with the fingers in the other electrode, insulating shaft means rotatably mounted in said housing for driving said gear, grounding contact means disposed in at least one of the electrodes, and pivotal grounding blade means recessed in said housing for engaging the grounding contact means, said grounding blade being disposed generally parallel to the axis of the housing in the open position.

7. A disconnect switch comprising a generally cylindrical, hollow housing, cylindrical conductors spaced longitudinally and disposed substantially entirely within the housing, combined insulators and gas barriers disposed at the opposite ends of the housing for supporting the conductors and for sealing off the gas space within the housing, generally cylindrical, hollow electrodes attached to the conductors, each electrode having a generally spherical end spaced from the spherical end on the other electrode, contact fingers disposed within each of the electrodes, a generally cylindrical reciprocating main switch blade slidably engaged by the fingers in one electrode, means for actuating the main blade axially into and out of engagement with main contact fingers in the other electrode, a quick-break auxiliary blade slidably mounted in the main blade, auxiliary contact fingers in the other electrode engaging the auxiliary blade, latch means releasably engaging the auxiliary blade, and current conducting spring means disposed around the auxiliary blade within the main blade and energized by movement of the main blade out of engagement with the main contact fingers for disengaging the auxiliary blade from the latch means and the auxiliary contact fingers with a quick-break action.

8. In a combined disconnect switch and bus structure, in combination, two spaced sections of bus conductor housing, a bus conductor in each housing, a generally cylindrical, hollow switch housing connected between the bus conductor housings in sealed relation therewith, two spaced switch conductors inside the switch housing, combined insulators and gas barriers disposed at the opposite ends of the switch housing for supporting the switch conductors and for sealing off the gas space within the switch housing, a reciprocating switch blade connecting the two switch conductors, means for actuating the switch blade, and said switch housing having a flexible portion at at least one end to take care of expansion of the housing.

References Cited

UNITED STATES PATENTS

| | | |
|---|---|---|
| 2,431,226 | 11/1947 | Berkey et al. |
| 2,549,350 | 4/1951 | Wallace et al. _____ 200—62 X |
| 2,762,881 | 9/1956 | Brockwell et al. ___ 200—153 X |
| 2,813,179 | 11/1957 | Rugg _____ 200—163 |
| 2,826,746 | 3/1958 | Lanctot _____ 200—153 X |
| 2,889,436 | 6/1959 | Albright _____ 200—163 |
| 3,027,439 | 3/1962 | Upton et al. _____ 200—148 |

FOREIGN PATENTS

| | | |
|---|---|---|
| 362,450 | 6/1962 | Switzerland. |

ROBERT K. SCHAEFER, *Primary Examiner*

H. HOHAUSER, *Assistant Examiner.*